United States Patent [19]

Schmidt et al.

[11] Patent Number: 4,838,901
[45] Date of Patent: Jun. 13, 1989

[54] LIGHTWEIGHT FILTER

[75] Inventors: Robert N. Schmidt, Cleveland; Haans K. Petruschke, Kirtland, both of Ohio

[73] Assignee: Life Systems, Inc., Cleveland, Ohio

[21] Appl. No.: 194,835

[22] Filed: May 17, 1988

[51] Int. Cl.⁴ .................. B01D 53/14; B01D 46/12
[52] U.S. Cl. ............................ 55/74; 55/68; 55/73; 55/97; 55/316; 55/320; 55/502; 55/510
[58] Field of Search ............. 55/68, 73, 74, 97, 316, 55/320, 387, 485, 493, 500, 502, 510, 517, 521, DIG. 30; 210/266, 477–479, 493.2

[56] References Cited

U.S. PATENT DOCUMENTS

| | | |
|---|---|---|
| 2,537,992 | 1/1951 | Gross et al. |
| 3,178,025 | 4/1965 | Brucken et al. |
| 3,542,199 | 11/1970 | Bray et al. |
| 3,731,678 | 5/1973 | Pyzel |
| 3,800,510 | 4/1974 | Lamond ................ 55/521 X |
| 3,880,627 | 4/1975 | Morton ................ 55/521 X |
| 3,957,469 | 5/1976 | Nebash. |
| 4,087,363 | 5/1978 | Rosemeyer et al. |
| 4,102,785 | 7/1978 | Head et al. |
| 4,256,474 | 3/1981 | Berger et al. ............ 55/316 X |
| 4,488,889 | 12/1984 | McConol ................. 55/502 |

Primary Examiner—Charles Hart
Attorney, Agent, or Firm—D. Peter Hochberg; Mark M. Kusner; Louis J. Weisz

[57] ABSTRACT

A lightweight, snap together filter is provided for use under high stress environmental conditions. The casing and cover of the filter may be molded from high strength plastics and has been designed to snap together by a snap lock mechanism to secure a subtantially pressure tight filter assembly. The filter assembly may be utilized in an aircraft and other vehicles that may be exposed to extreme environmental conditions. The filter is designed to withstand a wide range of temperatures.

24 Claims, 5 Drawing Sheets

LIGHTWEIGHT FILTER

BACKGROUND OF THE INVENTION

1. Field of the Invention

The present invention relates generally to filters for purifying fluids and more particularly to filters for vehicles including aircraft where weight is a critical parameter.

2. State of the Art

Filters are used for many applications to purify fluids. One such application is the removal of noxious or poisonous gases from air by chemical defense filters. These filters can be either made small enough to be portable to be carried by an individual in a gas mask filter, for example, as disclosed in U.S. Pat. No. 2,537,992, or may be made larger for cleaning air for one or more individuals in a collective protection enclosure.

Another example of a portable filter is disclosed in U.S. Pat. No. 3,731,678. This patent discloses a smoke inhalation protector for removing or reducing smoke and other noxious fumes from the air. This device contains two one-way valves that open or close, depending on inhalation or exhalation. The device also contains a canister for containing an adsorbent to adsorb smoke and other noxious gases, as well as converting carbon monoxide into carbon dioxide.

Examples of specialized filters for treating specific fluids include U.S. Pat. No. 3,178,025 which discloses a filter element for filtering and conditioning dry cleaning solvent. The filter contains an inner cartridge of an adsorbent and an outer shell of a folded paper filter.

In U.S. Pat. No. 3,542,199, a reverse osmosis water purification unit is disclosed. The unit comprises a casing containing a semipermeable membrane cartridge with brine flow control in the form of a pair of connected restrictive conduits.

U.S. Pat. No. 3,957,469 discloses a filter cassette with removable capsule usable for the measurement of respirable and airborne dust which may be present in mines, factories and the like.

In U.S. Pat. No. 4,087,363, a filter for blood containing a series of chambers is disclosed. Between each of the chambers are diaphragms having varying pore diameters for filtering various blood components.

U.S. Pat. No. 4,102,785 discloses an inside-to-outside flow filter tube comprising a series of concentrically disposed filter media. The filter tube of this patent finds use as a filter for exhaust gases, such as for exhaust gases of internal combustion engines.

Examples of collective protection filters include the M48 which was developed by the U.S. Army Chemical Systems Laboratory (now called the Chemical Research, Development and Engineering Center), Aberdeen Proving Grounds Edgewood Area, Maryland and its contractor Honeywell Inc., Tactical Support Operations under contract DAAK 11-80-C-0066, and produced under Specification No. EA-F-1284. These filters are used to protect modern tanks and other pieces of equipment and collective protection enclosures. These filters are typically cylindrically shaped and utilize a radial flow pattern. The air enters from one end of the filter, fills a hollow tube in the center of the filter, flows radially outward through a paper HIGH EFFICIENCY PARTICULATE AIR (HEPA) filter, through a bed of Whetlerite charcoal, through an annular space to the opposite end of the filter where it exits through an outlet. The material of construction for the housing containing these filters is typically aluminum. A 6061-0 aluminum is normally specified due to its formability, weldability and lower cost. However, the tensile strength for a 6061-0 aluminum is relatively low. This limits the operating pressure of lightweight, thin wall aluminum filters. Normally, the M48 and other similar chemical defense filters operate at only a few inches of water pressure. This low operating pressure inherently limits the flow through the filter.

A filter having low weight and volume combined with high fluid pressure and high fluid flow rate is desirable to meet the needs for use in aircraft and other vehicles. Also, a filter that may be assembled without welding, soldering or adhesively joining major joints or seams is desired to improve the ease of assembly and to lower the cost.

SUMMARY OF THE INVENTION

In accordance with the present invention, a lightweight, snap together filter device is provided for use in aircraft and other vehicles that may be exposed to severe, high stress environmental conditions. In general, the filter device comprises a lightweight, high strength plastic housing comprising a casing, sealing means and a cover, and an inside-to-outside fluid filter assembly contained within the housing which is sealed, pressure tight by the snap-lock cover for the casing. This specific combination provides a low weight and volume filter for filtering fluids at high pressure and at a high flow rate. The filter device, in accordance with the present invention, provides the additional advantage of optionally assembling the filter without welding, soldering or adhesively joining any of the major joints or seams. This further gives additional manufacturing and cost advantages.

Further in accordance with the present invention, there is provided a filter as described above wherein the casing is molded from a high strength plastic resin and comprises an open cavity, a top edge section and a bottom section. The bottom section is closed with the exception of an inlet port and the interior of the bottom section contains concentric annular walls spaced apart to align the elements of the fluid filter assembly. The top edge section is dimensioned to receive a sealing means for the filter device and further comprises means for snap locking a cover to the top edge section of the casing.

Still further in accordance with the present invention, the fluid filter assembly comprises a plurality of concentrically disposed filter media which include a solids particulate filter and an absorbent for contaminants, noxious gasses, and the like. It is also dimensioned to be aligned within the casing about a longitudinal axis through the center of the casing and to maintain such an alignment, and preferably contains a rounded top section for nesting with a gasket, a baffle plate and the cover.

Still further in accordance with the present invention, the filter device comprises a sealing means for the top section of the fluid filter assembly, and a baffle plate that nests above the sealing means for the fluid filter assembly for directing the flow of filtered fluid out of the filter.

Still further in accordance with the present invention, the filter comprises a sealing means for the filter in order that it is pressure tight and a cover that comprises an outlet port and means for snap-locking the cover to the casing.

The filter in accordance with the present invention provides a device for use in a high stress environment that may handle high flow rate under high pressures and varying temperature conditions while at the same time is lightweight relative to the commercially available filters or at least the ones in present use, and has high structural integrity that may be easily manufactured at a relatively low cost. These and other aspects of the present invention will be appreciated by those skilled in the art upon the reading and understanding of the specification.

BRIEF DESCRIPTION OF THE DRAWINGS

The invention will be further described in connection with the attached drawing figures showing preferred embodiments of the invention including specific parts and arrangements of parts. It is intended that the drawings included as a part of this specification be illustrative of the preferred embodiments of the invention and should in no way be considered as a limitation on the scope of the invention.

DETAILED DESCRIPTION OF THE PREFERRED EMBODIMENTS

The filter according to the present invention is usable in high stress environments, i.e., high or low pressures and high or low temperatures, and is capable of filtering fluids under high pressure and at a high fluid flow rate. This device, however, is of relatively low weight in that it weighs about 50 lbs. or less and preferably 35 to 45 lbs. for a 600 scfm filter, and may be assembled from all non-metallic materials or essentially all non-metallic materials.

Figure 1:
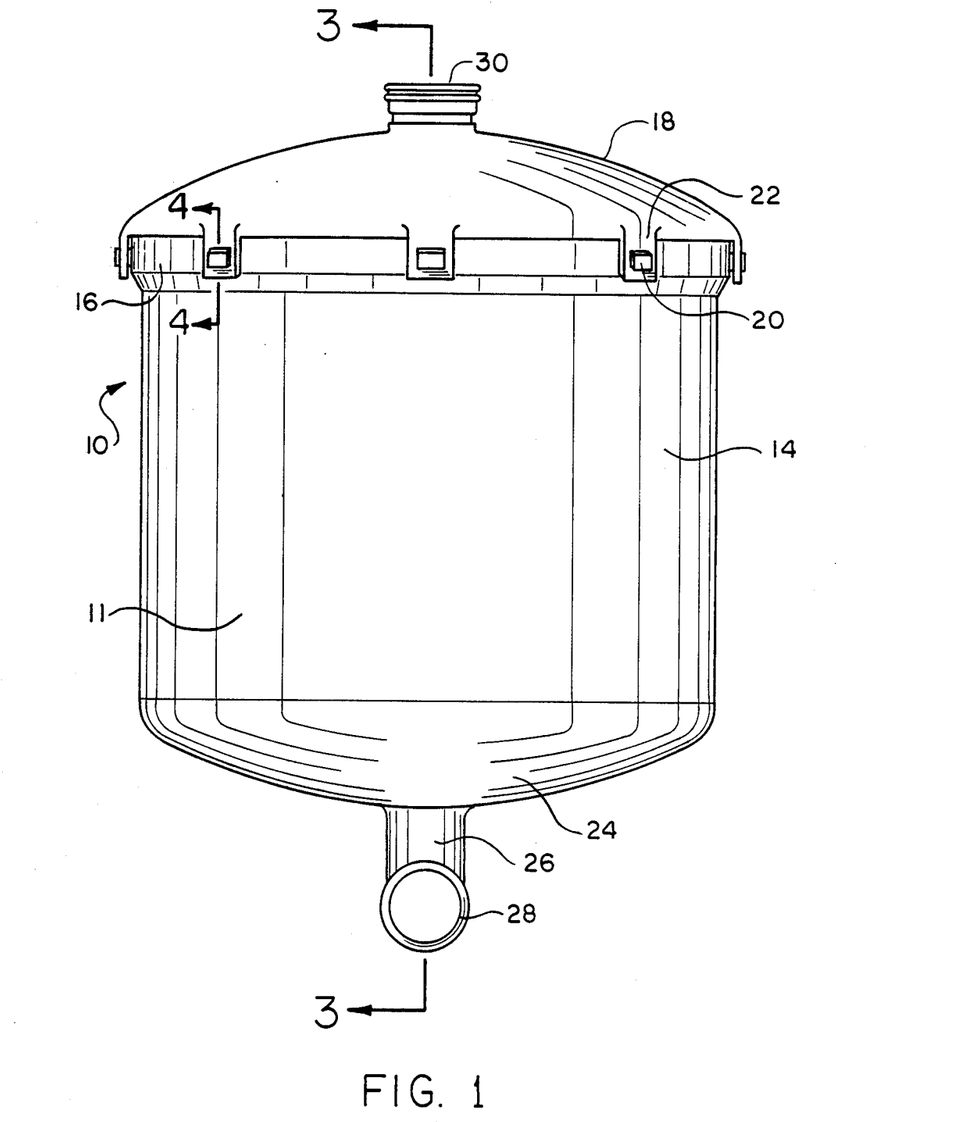
FIG. 1 is an elevational view of a filter device illustrating a preferred embodiment according to the present invention.
Figure 2:
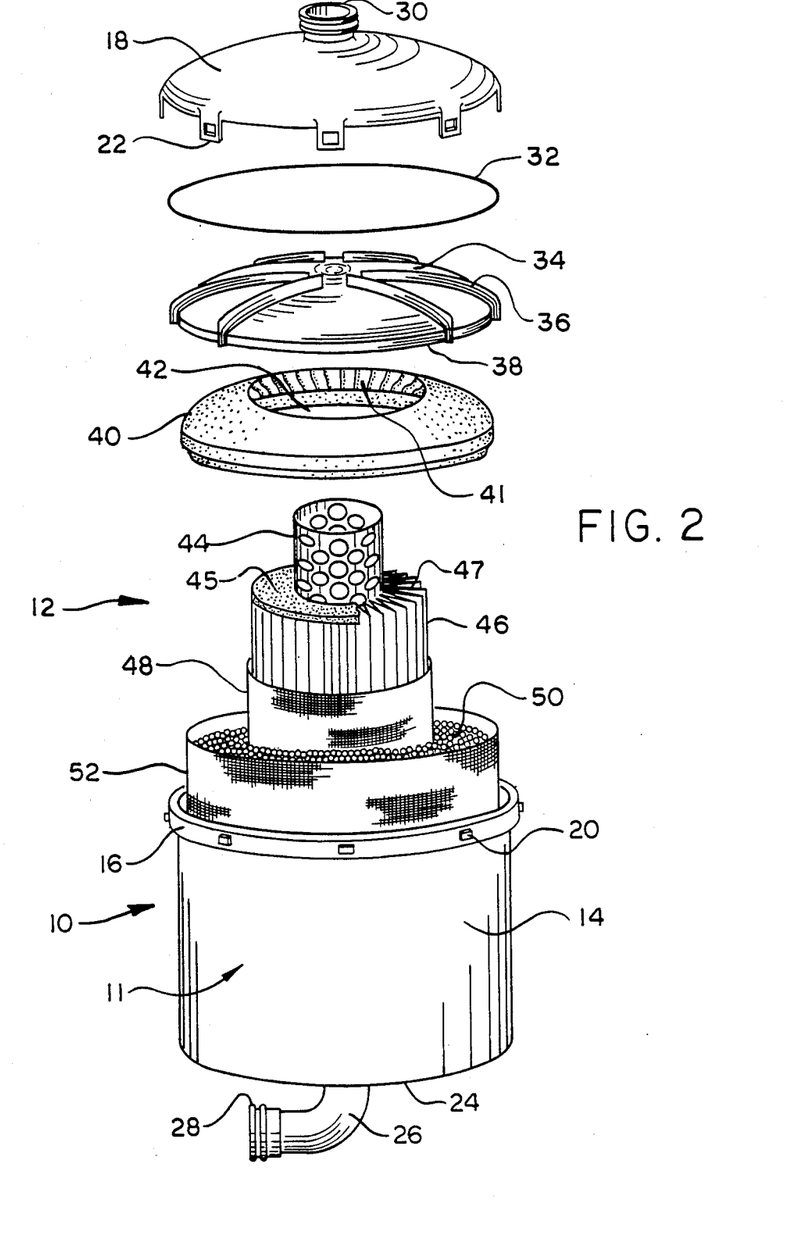
FIG. 2 is an exploded view of a filter device shown in FIG. 1.

Referring now to the drawings, and particularly to FIG. 1 and FIG. 2, a filter device illustrating a preferred embodiment of the present invention is shown. The filter 10 includes a housing 11 and a fluid filter assembly 12. The housing 11 and fluid filter assembly 12 generally are symmetrical about longitudinal axis A shown in FIG. 3.

The housing 11 comprises a generally cylindrical casing 14 defining an internal cavity with internal side walls, a top edge section 16 and bottom section 24. The bottom section is closed with the exception of inlet port 25 shown in FIG. 3. Integrally molded into the bottom section 24, is inlet tube 26, which in the illustrated embodiment is L-shaped, having fitted opening 28. The fitting illustrated for opening 28 is a flanged coupling. Other similar mating surfaces or fittings may be appropriate depending upon the particular use of the filter device 10. The bottom section 24 is rounded to increase the structural integrity and strength. The interior surface of the bottom section contains concentric annular walls 54 (shown in FIG. 3) integrally formed into bottom section 24. The annular walls 54 serve the function of aligning and maintaining the alignment of the elements of the fluid filter assembly 12 along longitudinal axis A. It should be recognized that it is necessary to maintain the fluid filter assembly 12 symmetrical about longitudinal axis A in order to maximize filtering efficiency. The annular walls 54 may also be pins or studs concentrically disposed in the bottom section 24 or the like. For the purposes of the present invention, concentric annular walls integrally molded into the interior bottom section 24 are preferred. It is also pointed out that the outermost or edge annular wall 54 in bottom section 24 serves not only the function of aligning the outer retainer screen 52 but also provides for defining the annular gap 57 (see FIG. 3).

The top edge section 16 of casing 14 comprises a reinforcing shoulder and posts 20. The posts 20 provide means for snap locking a cover 18 to casing 14 by communication with tabs 22 depending from the edge of cover 18. The top edge section 16 further comprises an annular groove or rounded recessed area 60 (shown in FIGS. 4 and 5) to seat elastomeric O-ring 32 which together with cover 18 is operable to form a pressure tight seal when tabs 22 are snaplocked to posts 20. The top reinforcing shoulder of top edge section 16 has upwardly facing surfaces 61 (shown in FIG. 4) generally perpendicular to longitudinal axis A. The outermost edge of the upwardly facing surface 61 is rounded (see FIG. 4).

Figure 4:
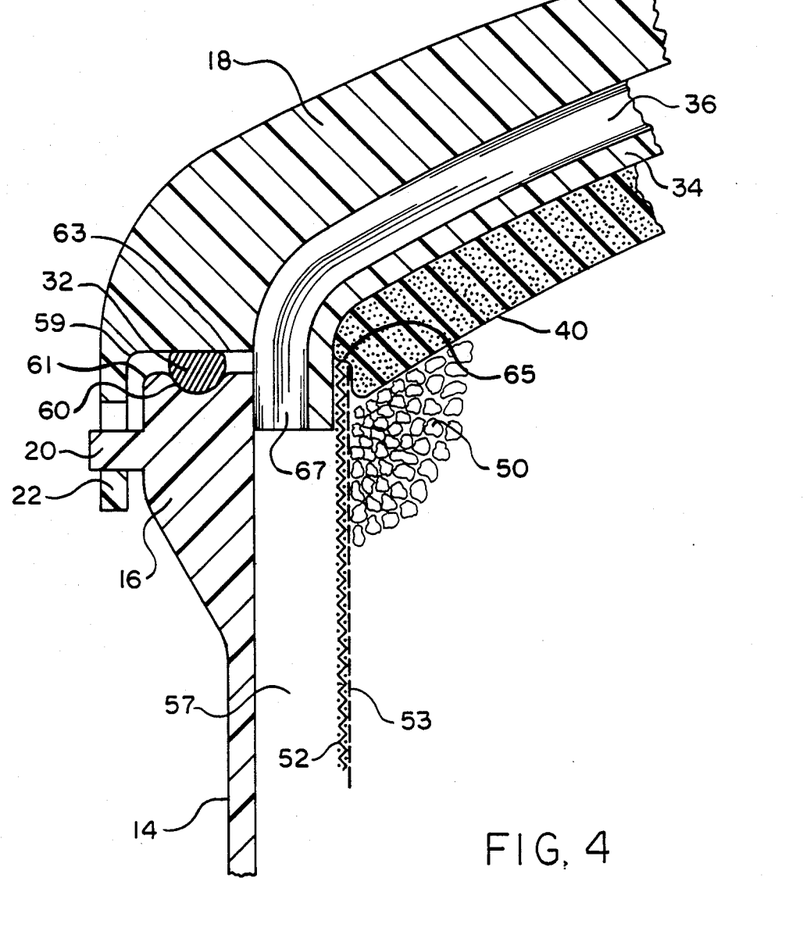
FIG. 4 is an enlarged sectional view along line 4—4 of FIG. 1.
Figure 5:
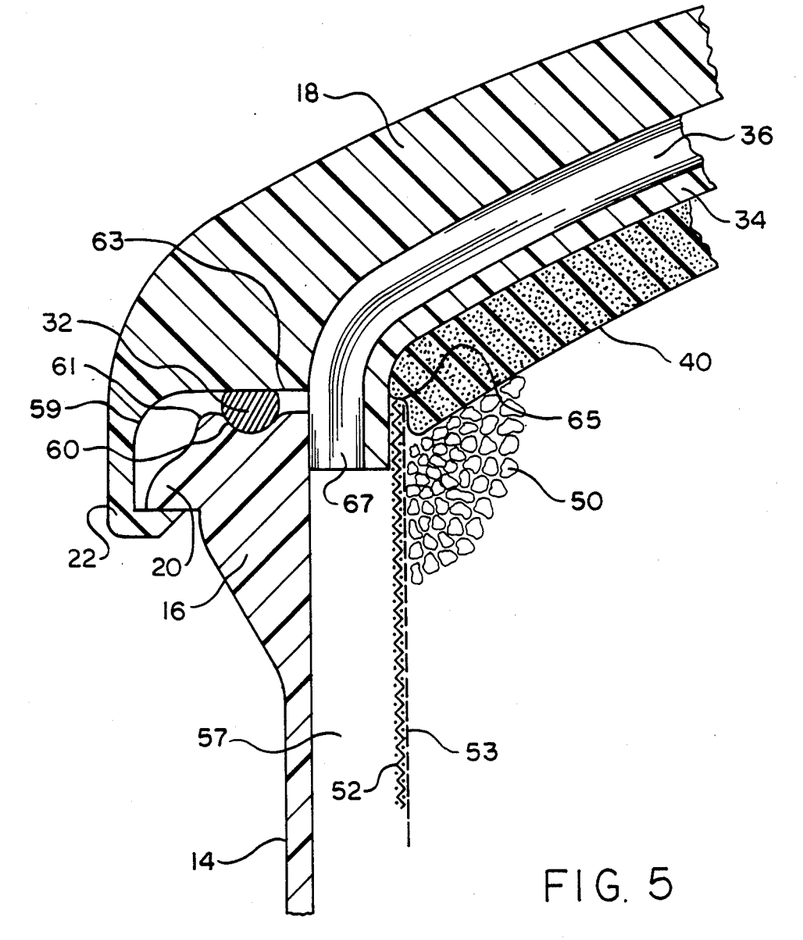
FIG. 5 is an enlarged sectional view illustrating an alternate embodiment of the locking means shown in FIG. 5.

The housing 11 further comprises a cover 18, and sealing means 32. The cover 18 contains tabs 22 disposed along the outer edge of the cover 18. The cover 18 is rounded and includes outlet 30 having a flanged fitting. As illustrated in FIG. 4, cover 18 has downwardly facing surface 63 which is generally perpendicular to longitudinal axis A. Cover 18 also has rounded outer most edge 59 of downwardly facing surface 63. The sealing means 32 is preferably an elastomer O-ring or other elastomeric seal. In an alternative embodiment, an O-ring edge seal may be used around the perimeter of the top edge section 16, i.e., just below rounded edge 61.

The fluid filter assembly 12 includes a series of concentrically disposed filtering media and retaining means. The core of the fluid filter assembly is an innermost retaining means 44 centrally disposed about axis A which is a screen or perforated sheet made of aluminum, other metal or plastic. Disposed concentrically about the innermost retaining means 44 is a solids, particulate filter 46 which is fan-folded filter paper rolled in a cylindrical shape and sealed to itself along a longitudinal seam. For the purposes of the present invention, the most preferred particulate filter is a HEPA filter. The particulate filter 46 is bordered by intermediate retaining means 48 which is a cylindrical screen or perforated sheet made from aluminum, other metals or plastic. Concentrically disposed about intermediate retaining means 48 is a fixed absorbent bed 50 for adsorbing dissolved and dispersed contaminants, noxious gases and the like. The fixed adsorbent bed 50 is Whetlerite activated carbon and is preferably TEDA ASC Whetlerite carbon or an immobilized carbon bed made of TEDA ASC Whetlerite. The fixed carbon bed 50 is bordered on its exterior perimeter by an outer retaining means 52. The outer retaining means 52 is also a cylindrical screen or perforated sheet produced from aluminum, other metals or plastic. Also, mounted to the interior side of the outer retainer means 52 is a fines filter 53 (shown in FIG. 3) for the fines or particles that may be generated by abrasion of the adsorbent as a result of vibrational forces impacting on the filter. The fines filter 53 is preferably a cloth filter and most preferably a polypropylene cloth filter.

Figure 3:
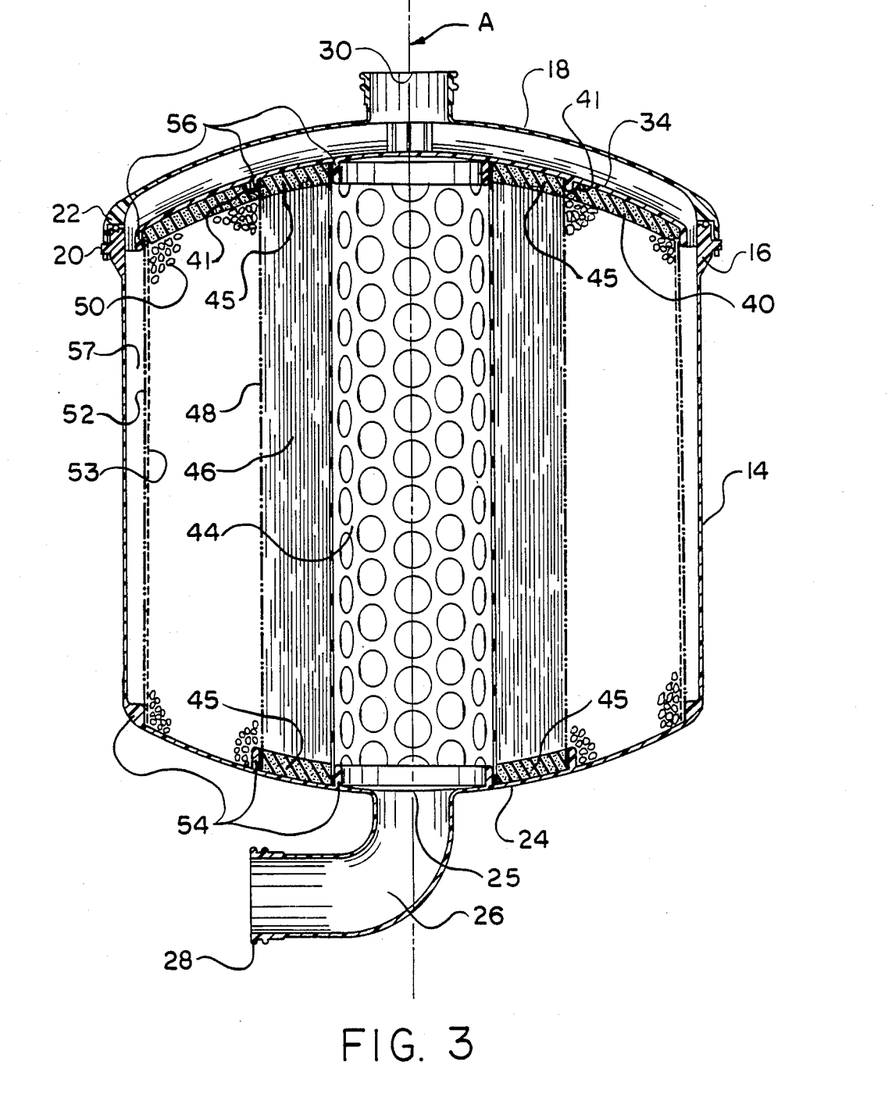
FIG. 3 is a sectional view along line 3—3 of FIG. 1.

The fluid filter assembly 12 is located in casing 14 and aligned by alignment means 54, i.e. The concentric annular walls, on the interior bottom section 24 (shown in FIG. 3). An annular gap 57 (shown in FIG. 3) is provided between the interior wall of casing 14 and the exterior surface of outer retainer means 52 to allow filtered fluid to flow along the interior wall to the top of the filter.

The top and bottom edges of the fan folded particulate filter 46 are cut along the outermost edge to form a rounded top surface or bottom surface 47. A polyurethane foam 45 or other deformable material is injected into the top and bottom sections of the fan-folded particulate filter 46 to form a rounded or domed shape surface. This is illustrated in FIGS. 2 and 3. The injected polyurethane foam 45 gives the particulate filter 20 greater dimensional integrity and aids in maintaining its cylindrical form. It also acts to seal the top and bottom of the particulate filter 46.

Sealing the top of the fixed absorbent bed 50 is sealing means 40 which is a deformable element that is generally circular and having a central opening 42. The sealing means illustrated is a compression gasket made of closed cell silicone foam or polyurethane or other foam or a metal or plastic spring loaded plate. For the purposes of the present invention, a closed cell silicone foam or polyurethane foam compression gasket is most preferred. Shoulder 41 is illustrated for gasket 40 to allow for a tight fit with a baffle plate 34. Likewise, shoulder 65 (FIG. 4) provides a tight fit with outer retaining screen 52 and baffle plate 34.

Baffle plate 34 has ribs 36 extending radially along the top surface to direct the flow of filtered fluid to outlet 30. The ribs 36 are flush with the edge 38 of baffle plate 34 in order to allow the filtered fluid to flow from annular gap 57 and out of the filter through outlet 30. The baffle plate 34 also has a rounded shape to nest with cover 18. On the underside of baffle plate 34 are alignment means 56 for further aligning filter assembly 12 elements. The alignment means are concentric annular walls or in an alternative embodiment are pins molded into the underside of baffle plate 34. The middle annular wall 56 nests with shoulder 41 of gasket 40 (shown in FIG. 3). Rib 36 and baffle plate edge 38 are curved to allow the edge 38 and Rib 36 to insert into annular gap 57, in order to maintain the alignment of the top of retainer screen 52. Furthermore, the design of baffle plate 34 (shown as 67 in FIGS. 4 and 5) provides for additional structural stability of the upper internal perimeter of the filter by the rib and edge 67 of plate 34 inserting in annular gap 57.

Hence, for the assembled filter device 10, the compression gasket 40 sits on top of and seals the fixed adsorbent bed 50 and is an element of fluid filter assembly 12. Baffle plate 34 sits on top of and compresses compression gasket 40 and polyurethane foam 45. The baffle plate 34, as discussed above, also contains alignment means i.e., annular walls, 56 projecting downwardly from the underside of the plate 34 in order to aid in aligning fluid filter assembly 12 about longitudinal axis A and to further stabilize the fluid filter assembly 12 in order to further inhibit the shifting of the filter media under vibrational and acceleration forces. In an alternative embodiment, the ribs 36 extend beyond edge 38 and into the annual gap 57, either along the entire length of the casing 14 or part way. The cover 18 is then seated on top of baffle plate 34 and locked on to casing 14 by snap locking tabs 22 to posts 20 to form a substantially pressure tight, completely assembled lightweight filter for use in aircraft and other vehicles.

In making the filter lightweight, as compared to filters presently in use, it has been found that by utilizing high strength plastics in combination with a spherical or elliptical or rounded ends for the filter, a 600 scfm filter or less than 50 pounds may be produced and at the same time provide the necessary structural integrity. This may be compared to the 100 scfm M48 filter which weighs 26.6 lbs or the 200 scfm M56 filter which weighs 52 lbs without its housing. The high strength plastic materials that may be used to produce the housing includes such materials as polyimides, polyetherimides, poly(amide-imides), polyethersulfones, polyetherketones, polyetheretherketones, polyarylamides, epoxy resins and other high strength plastic resins. The above listed plastics may be fiber reinforced as well. The polyetherimides, poly(amide-imides), polyetheretherketones (PEEK) and polyethersulfones (PES) are preferred for the purposes of the present invention.

Following is a listing of the preferred high strength plastics along with some of their properties and a comparison to aluminum:

| Material | Tensile Strength ksi | Density lb/in | Strength/ Weight Ratio ksi-in/lb |
| --- | --- | --- | --- |
| Ultem TM 2400 (polyetherimide) | 27,000 | 0.058 | 465,517 |
| Torlon TM 5030 (poly(amide-imide)) | 29,700 | 0.058 | 512,068 |
| Victrex TM PES 4101GL30 | 20,000 | 0.057 | 350,877 |
| Victrex TM PEEK 450CA30 | 36,000 | 0.052 | 692,307 |
| 5052-H34 Aluminum | 26,000 | 0.096 | 270,833 |
| 2024-T3 Aluminum | 57,000 | 0.096 | 593,750 |
| 6061-0 Aluminum | 12,000 | 0.096 | 125,000 |

Structural integrity of the filter assembly according to the present invention is critical since it may have to withstand acceleration forces up to 10.5G when not operating and 7G when operating, vibrational forces of 2.5 G and vibrations ranging from 5 to 2,000 Hz. Furthermore, it may subjected to temperatures ranging from −65° F. to +160° F. and pressures of up to about 185 psi or higher. These conditions generally relate to use of the filter in an aircraft. Therefore, the plastic selected will be required to perform under these conditions and maintain a substantially pressure tight system.

The fluid filter assembly 12 will also have a rounded or domed top section in order to nest with the cover for the casing. As discussed above, in a preferred embodiment of the present invention, housed within the casing will be a fixed adsorbent bed. The preferred adsorbent is an activated carbon and most preferably an ASC Whetlerite carbon, or a TEDA ASC Whetlerite carbon. An immobilized carbon adsorbent bed may also be utilized wherein the carbon particulate is held together by a polymer binder. Such a carbon bed is disclosed in U.S. Pat. No. 4,664,683. By using an immobilized bed, the outer retainer means 52 and intermediate retainer means 48 may optionally be omitted. Other adsorbents that may also be used include molecular sieves, zeolites, silica gels and the like.

The fixed adsorbent bed is held intact by providing a constant force on the fixed adsorbent bed by a sealing means at the top section of the fluid filter assembly 12. The sealing means may be for example, a closed cell silicone foam, a polyurethane foam and the like or a spring loaded metal or plastic plate. Furthermore, retraining screens or perforated sheets of aluminum, other metal and/or plastic disposed around the exterior of the bed and interior to the bed may be utilized to keep the fixed carbon bed intact. The bottom section 24 of the casing 14 contains spaced apart, concentric annular walls 54, to hold the retaining screens 48 and 52, in alignment and further maintain the adsorbent carbon bed 50 intact. A thin layer foam or deformable barrier material may be optionally located under the fixed adsorbent bed 50 between the annular walls 54 to minimize channeling between the bottom section 24 and fixed adsorbent bed 50.

Interior to the fixed adsorbent bed and the intermediate retaining screen is a particulate filter. For the purposes of the present invention, a preferred particulate filter is a folded paper filter such as those filters complying with military specification Mil-F-51079, i.e., a High Efficiency Particulate Air (HEPA) filter. This particulate filter is held in place by the intermediate retaining screen 48 and the innermost retaining screen 44 that are aligned axially. As previously discussed, the retaining screens may be an aluminum, steel, other metal or plastic screen, or perforated sheet.

It is advantageous to also provide an outer fines filter surrounding the fixed carbon bed to filter out any of the absorbent fines or particles that may be generated by abrasion of the adsorbent due to shock or vibration on the filter. This particulate file may optionally be multilayered to provide additional stiffness and/or prefiltration. It is preferred for the purposes of the present invention to utilize a polypropylene cloth for this filter media as opposed to, for example, a muslin cloth that requires mildew treatment.

The cover is sealed to the casing of the filter, as discussed above, by a sealing means and preferably a elastomeric O-ring.

It will be recognized by those skilled in the art that other similar latching means may be substituted for that illustrated in FIG. 4. For example, top section 16 may comprise a continuous lip 20 around the perimeter of the top section 16 and cover 18 comprises a continuous tab 22 along the perimeter of the cover edge which snaps over lip 20 to give a substantially pressure tight seal for the assembled filter device (shown in FIG. 5). Other snap lock mechanisms are contemplated and intended to be within the scope of the present invention. For example, the casing may contain posts 20 extending from the outer top edge 16 of the outer surface of the casing and correspondingly the cover 18 containing a series of L-shaped tabs 22 extending from the edge of the cover 18, such that by twisting the cover 18, the tabs 22 lock on the post 20 extending from the top edge 16 of the casing. Alternatively, the posts 20 or other locking elements may be located along the perimeter of the bottom of the filter and the tabs 22 or other locking elements may extend from the edge of the cover 18 to communicate with the posts 20 and lock the cover 18 to the housing 11. It will be further recognized by one skilled in the art that depending on the size of the filter, the operating pressures, the environment of its use, materials of construction and the like will be determinative of the particular snap lock mechanism used.

Various plastic components of the filter device according to the present invention may be prepared or produced by conventional machining or molding techniques and preferably by injection molding. This provides further advantages from the standpoint of ease of manufacturing, and reduces cost, as well as increasing the ease of assembly.

The dimensions of the filter according to the present invention are dependent upon its particular use. For example, a 600 scfm filter for use in aircraft may have a diameter of about 15 inches and a height of about 20 inches from the top flange of the outlet port to the center of the inlet port in the bottom of the casing. However, a filter for use, e.g., in a chemical plant or other similar applications, may be much larger. A filter for use by a single individual would be much smaller. Also, the material of construction as well as the environment of use will affect the dimensions of the device.

The filter assembly according to the present invention is designed to preferably weigh less than about 50 lbs. The filter according to the present invention is designed to withstand a 150% of the maximum operating pressure (i.e., 111 psi) at the maximum operating temperature without damage or subsequent performance degradation. It is also designed to withstand 250% of the maximum operating pressure, i.e., 185 psi at the maximum operating temperature without bursting.

While the invention has been described and illustrated above with reference to the specific preferred embodiments thereof, those skilled in the art will appreciate that various changes, modifications and substitutions may be made therein without departure from the spirit of the invention. For example, different materials may be substituted for the filter media as well as different plastics utilized in producing the casing, cover, and baffle plate for the filter device. Such other expected variations or difference in results are contemplated in accordance with the practices of the present invention. It is intended therefore, that the invention be limited only by the scope of the claims which follow.

It is claimed:

1. A lightweight snap together filter comprising:
 (I) a housing comprising:
  (A) a high strength plastic casing comprising a top section, a bottom section, and a central cavity, said bottom section is closed except for an inlet port and said top section is open, the top edge of said top section is dimensioned to receive sealing means and comprises means for snap locking a cover to the top section of said casing,
  (B) sealing means for said casing, and
  (C) a high strength plastic cover, said cover comprising an outlet port and means for snap locking said cover to said casing; and
 (II) an inside-to-outside fluid filter assembly housed within said housing comprising:
  (A) a plurality of concentrically disposed filter media, wherein said filter media is capable of removing solid particulate, and other components from said fluids and comprising at least one solid particulate filter and adsorbent means,
  (B) sealing means for said fluid filter assembly, and
  (C) a plate comprising means for directing the flow of filtered fluid out of said filter assembly located above said sealing means for said fluid filter assembly.

2. The fluid filter assembly according to claim 1 wherein said fluid filter assembly comprises an innermost retaining means axially disposed about a central longitudinal axis of said casing, a solids, particulate filter concentrically disposed about said innermost retaining means an intermediate retaining means concentrically disposed about said solids particulate filter, adsorbent means concentrically disposed about said intermediate retaining means, filter means for said adsorbent means concentrically disposed about said adsorbent means, and outer retaining means for said adsorbent means concentrically disposed about said filter means for said adsorbent means.

3. The filter assembly according to claim 2 wherein said solids particulate filter is a High Efficiency Particulate Air (HEPA) fan folded paper filter and wherein said adsorbent means is ASC Whetlerite carbon or a TEDA ASC Whetlerite carbon.

4. The filter assembly according to claim 2 wherein said innermost retaining means, intermediate solids particulate retaining means and outer retainer means for said adsorbent means are selected from the group consisting of a screen or perforated sheet produced from aluminum, steel, other metal or plastic.

5. The filter assembly according to claim 2 wherein the top section of said assembly is rounded and said sealing means for said fluid filter assembly comprises a circular compression foam gasket produced from polyurethane or silicone for sealing said adsorbent means and polyurethane foam sealing the top and bottom of said solids particulate filter.

6. The filter assembly according to claim 2 wherein said bottom section of said casing further comprises raised concentric annular walls spaced apart to align said retaining means about a longitudinal axis through the center of said casing.

7. The filter according to claim 1 wherein said lightweight casing is injection molded from a high strength, high temperature resistant lightweight plastic selected from the group consisting of polyetheretherketone, polyetherimide, poly(amide-imide), polyimide and polyethersulfone.

8. The filter according to claim 1 wherein said plate comprises ribs extending radially outward from the center of the plate on the top side of said plate to facilitate the flow of filtered fluid out of said outlet port and wherein said plate further comprises alignment means on the bottom side of said plate.

9. The filter according to claim 7 wherein said inlet port is an L-shaped tube molded into the bottom of said casing.

10. The filter according to claim 1 wherein said sealing means for said filter is an elastomer O-ring which seats in a groove in the top edge of the top section of said casing.

11. The filter according to claim 1 wherein said snap-lock mechanism comprises posts extending outwardly from the exterior surface of the top edge of said casing and tabs on the radial outer edge of said cover wherein said tab communicates with said post to produce a pressure tight lock and seal in cooperation with said sealing means.

12. A lightweight snap together filter assembly comprising:
(I) a housing comprising:
a high strength plastic casing comprising a top section, a bottom section, and a central cavity, said bottom section is closed except for an inlet tube leading to an inlet port in said bottom section, said bottom section comprising raised concentric annular walls spaced apart on the interior surface of said bottom section, and said top section is open wherein the top edge of said top section comprises an area to receive an O-ring for sealing said filter, said top section further comprises outwardly projecting posts on the upper exterior surface of said casing, an O-ring seated in said area of said top section of said casing, and a high strength plastic cover comprising an outlet port and tabs on the radially outer edge of said cover wherein said tabs communicate with said posts to snap-lock said cover on said casing to produce a pressure tight seal in cooperation with said O-ring; and (II) an inside-to-outside fluid filter assembly housed within said casing comprising:

an innermost retaining means axially disposed about a longitudinal axis through the center of said casing, a solids, particulate filter concentrically disposed about said innermost retainer means, an intermediate retainer means for said solids particulate filter concentrically disposed about said solids particulate filter, an adsorbent means concentrically disposed about said intermediate retainer means, fines filter means for adsorbent particulate concentrically disposed about said adsorbent, and outer retainer means for said adsorbent means concentrically disposed about said fines filter means, said innermost retainer means, intermediate retainer means and outer retainer means are aligned by said raised concentric annular walls on the interior surface of said bottom section, the top section of said fluid filter assembly having a rounded shape, sealing means for said fluid filter assembly comprising a circular gasket produced from polyurethane or silicone foam for sealing said adsorbent means and polyurethane foam sealing the top and bottom of said solids particulate filter, and a plate comprising radially projecting ribs on the top side of said plate wherein said ribs direct the flow of filtered fluid out of the filter and concentric annular walls projecting downwardly from the bottom side of said plates for aligning said innermost retainer means and said intermediate retainer means wherein said plate further comprises a curved downwardly projecting edge for aligning said outer retaining means.

13. A method for removing contaminants from a fluid stream comprising:
(I) passing said fluid stream through a lightweight snap together filter comprising:
(A) a housing comprising:
(i) a high strength plastic casing comprising a top section and a bottom section, said bottom section is closed except for an inlet port and said top section is open, the top edge of said top section is dimensioned to receive sealing means and comprises means for snap locking a cover to the top section of said casing;
(ii) sealing means for said casing and (iii) a high strength plastic cover, said cover comprising an outlet port and means for snap locking said cover to said casing (B) an inside-to-outside fluid filter assembly within said housing comprising:
 (i) a plurality of concentrically disposed filter media, wherein filter media is capable of removing solid particulate, dissolved and dispersed components from said fluids and comprising at least one solid particulate filter, and adsorbent means, and
 (ii) a plate comprising means for directing the flow of filtered fluid out of said filter assembly located above said sealing means for said fluid filter assembly; and (II) directing the filtered fluid stream to the desired environment.

14. The method according to claim 13 wherein said fluid filter assembly comprises an innermost retaining means disposed about a longitudinal axis;
 a solids, particulate filter concentrically disposed about said innermost retaining means;
 an outer solids particulate filter retaining means concentrically disposed about said solids particulate filter;
 adsorbent means concentrically disposed about said outlet particulate filter retaining means;
 filter means for said adsorbent means concentrically disposed about said adsorbent means; and
 retaining means for said adsorbent means concentrically disposed about said adsorbent means.

15. The method according to claim 14 wherein said solids particulate filter is a High Efficiency Particulate Air (HEPA) fan folded paper filter and wherein said adsorbent means is ASC Whetlerite carbon or a TEDA ASC Whetlerite carbon.

16. The method according to claim 14 wherein said innermost retaining means, intermediate retaining means and outer retaining means are selected from the group consisting of an aluminum screen, perforated plastic sheet, or a perforated aluminum sheet.

17. The method according to claim 14 wherein the top section of said fluid filter assembly is rounded and said sealing means for said fluid filter assembly comprises a circular compression foam gasket produced from polyurethane or silicone for sealing said adsorbent means and polyurethane foam sealing the top and bottom of said solid particulate filter.

18. The method according to claim 14 wherein said bottom section of said casing further comprises raised concentric annular walls spaced apart to align said retaining means for said solids particulate filter and said adsorbent means.

19. The method according to claim 13 wherein said lightweight casing is injection molded from a high strength, high temperature resistant lightweight plastic selected from the group consisting of polyetheretherketone, polyetherimide, poly(amide-imide), polyimide and polyethersulfone.

20. The method according to claim 13 wherein said plate comprises ribs extending radially outward from the center of the plate on the top side of said plate to facilitate the flow of filtered fluid out of said outlet port.

21. The method according to claim 19 wherein said outlet port is an L-shaped tube molded into the bottom of said casing.

22. The method according to claim 13 wherein said sealing means for said filter is a elastomer O-ring which seats in a groove in the top edge of the top section of said casing.

23. The method according to claim 13 wherein said snap-lock mechanism comprises a post extending outwardly from the exterior surface of the top edge of said casing and a tab on the radial outer edge of said cover wherein said tab communicates with said post to produce a pressure tight lock and seal in cooperation with said sealing means.

24. A lightweight snap together filter assembly comprising:
 (I) a housing comprising:
  a high strength plastic casing comprising a top section, a bottom section, and a central cavity, said bottom section is closed except for an inlet tube leading to an inlet port in said bottom section, said bottom section comprising raised concentric annular walls spaced apart on the interior surface of said bottom section, and said top section is open wherein the top edge of said top section comprises an area to receive an O-ring for sealing said filter, said top section further comprises an outwardly projecting continuous lip along the perimeter of the upper exterior surface of said casing, an O-ring seated in said area of said top section of said casing, and
  a high strength plastic cover comprising an outlet port and a continuous tab along the radially outer edge of said cover wherein said tab communicates with said lip to snap-lock said cover on said casing to produce a pressure tight seal in cooperation with said O-ring; and
 (II) an inside-to-outside fluid filter assembly housed within said casing comprising:
  an innermost retaining means axially disposed about a longitudinal axis through the center of said casing, a solids, particulate filter concentrically disposed about said innermost retainer means,
  an intermediate retainer means for said solids particulate filter concentrically disposed about said solids particulate filter,
  an adsorbent means concentrically disposed about said intermediate retainer means,
  fines filter means for adsorbent particulate concentrically disposed about said adsorbent, and
  outer retainer means for said adsorbent means concentrically disposed about said fines filter means,
  said innermost retainer means, intermediate retainer means and outer retainer means are aligned by said raised concentric annular walls on the interior surface of said bottom section, the top section of said fluid filter assembly having a rounded shape, sealing means for said fluid filter assembly comprising a circular gasket produced from polyurethane or silicone foam for sealing said adsorbent means and polyurethane foam sealing the top and bottom of said solids particulate filter and
  a plate comprising radially projecting ribs on the top side of said plate wherein said ribs direct the flow of filtered fluid out of the filter, and concentric annular walls projecting downwardly from the bottom side of said plates for aligning said innermost retainer means and said plate further comprises a curved downwardly projecting edge for aligning said outer retaining means.

* * * * *